United States Patent
Suzuki

(10) Patent No.: US 7,646,502 B2
(45) Date of Patent: Jan. 12, 2010

(54) DRIVER PROGRAM AND TRANSFER METHOD FOR DATA

(75) Inventor: Tetsuya Suzuki, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 912 days.

(21) Appl. No.: 11/093,729

(22) Filed: Mar. 29, 2005

(65) Prior Publication Data

US 2006/0066894 A1    Mar. 30, 2006

(30) Foreign Application Priority Data

Mar. 29, 2004 (JP) ............................. 2004-095234

(51) Int. Cl.
*G06F 3/12* (2006.01)
(52) U.S. Cl. ..................... 358/1.15; 358/466
(58) Field of Classification Search ........... 358/1.1–1.9, 358/1.11–1.15; 347/115
See application file for complete search history.

(56) References Cited

U.S. PATENT DOCUMENTS 5,907,666 A * 5/1999 Yano et al. .................. 358/1.9
6,049,394 A * 4/2000 Fukushima ................. 358/1.9
6,304,335 B1 * 10/2001 Furuya et al. .............. 358/1.15

FOREIGN PATENT DOCUMENTS

| JP | 11-203070 | 7/1999 |
| JP | 2002-236563 | 8/2002 |
| JP | 2004-248209 | 9/2004 |

* cited by examiner

*Primary Examiner*—King Y Poon
*Assistant Examiner*—Lennin R Rodriguez
(74) *Attorney, Agent, or Firm*—Hogan & Hartson LLP

(57) ABSTRACT

A driver program is provided for causing a host apparatus to execute a processing of generating color-converted image data and transferring it to a printing apparatus, this program making it possible to decrease the volume of image data to be stored in the host apparatus and to conduct data transfer without delaying the printing completion. A driver program causes a host apparatus to execute a processing of generating image data comprising data of a plurality of colors and transferring it to a printing apparatus. When the transfer of the image data of one plane is conducted, the driver program causes the host apparatus to execute a transfer processing conducted by intermingling a step of transferring by each band of the bands obtained by dividing the image data of one plane at the prescribed height, and a step of transferring by each color of the plurality of colors.

4 Claims, 4 Drawing Sheets

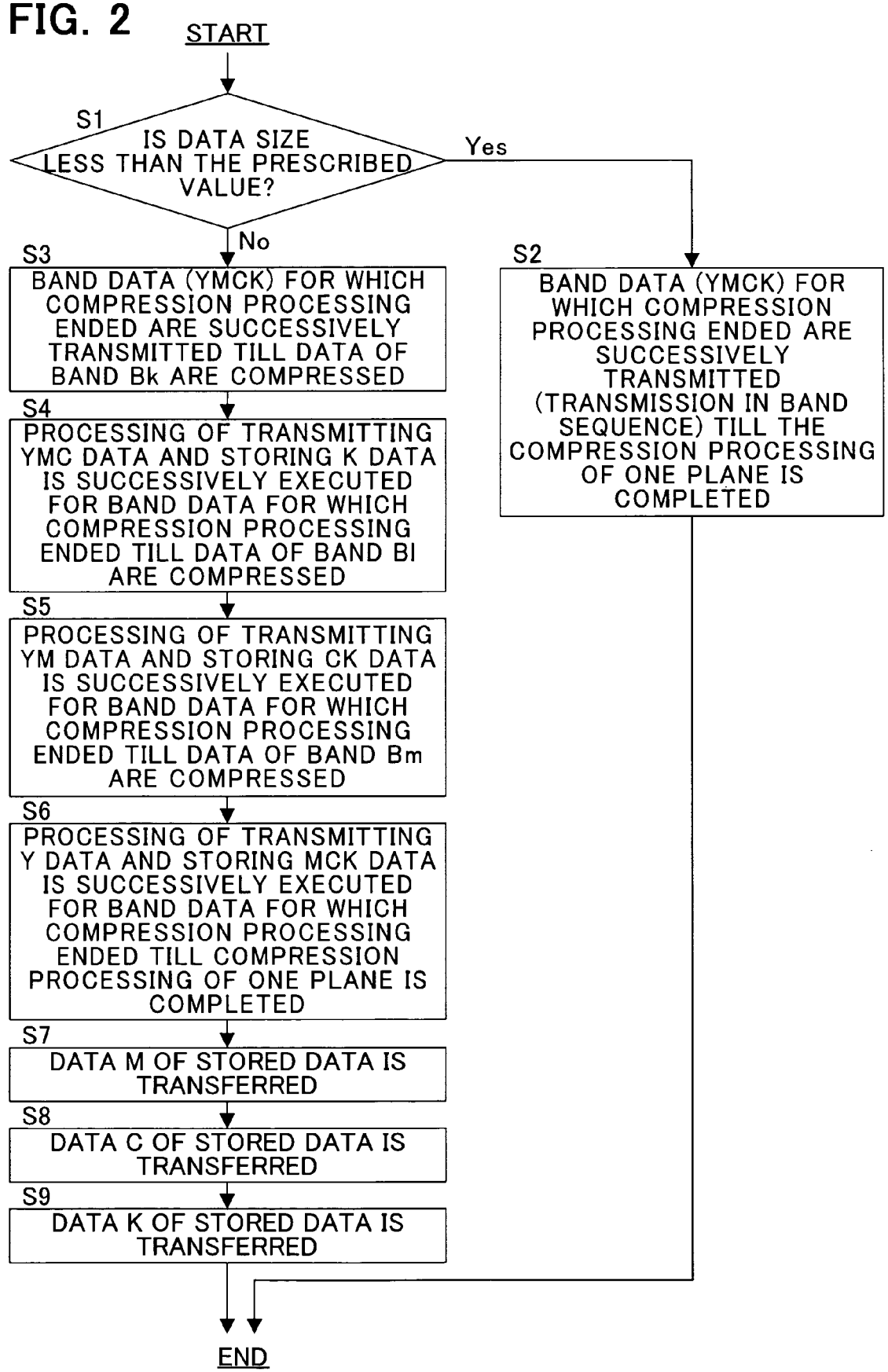

DRIVER PROGRAM AND TRANSFER METHOD FOR DATA

BACKGROUND OF THE INVENTION

1. Technical Field

The present invention relates to a driver program or the like for causing a host apparatus to execute a processing of generating image data in the host apparatus and transferring those image data to a printing apparatus, and more particularly to a driver program or the like that makes it possible to reduce the volume of image data to be stored in the host apparatus and to conduct data transfer without a delay in a printing completion time.

2. Background Art

Usually in a printing system for executing printing on a printing medium such as paper, printing data is transmitted from a host apparatus, such as a personal computer, and the printing apparatus that received printing data implements printing based on the printing data. Before the printing is completed, the following types of processing are carried out with respect to the printing data: a processing of obtaining image data in which the data of a printing request issued from an application of the host apparatus are represented as color density values for each pixel, a processing of converting the color representation of the image data into color representation in the printing apparatus, and a processing of representing the color converted data as dot images.

In recent years, the so-called host base processing in which all the operations prior to color conversion processing are implemented in the host apparatus has been conducted. In such cases, the image data after color conversion are compressed in the host apparatus and then transmitted to the printing apparatus. In the printing apparatus, the received data are used after decompression. Furthermore, in the compression processing of the image data transmitted from the host apparatus, the processing is usually conducted for each of the regions (called bands) that are obtained by dividing the range of one plane of the printing medium to prescribed lengths in the height direction. For example, when image data after color conversion are represented by Y (yellow), M (magenta), C (cyan), and K (black), the image data comprising data of those four colors are sequentially compressed in band units and become a state suitable for transmission to the printing apparatus.

Several methods have been used in the past for transferring the data subjected to such compression processing to the printing apparatus. With one of such methods the transmission to the printing apparatus is sequentially conducted from the image data of the compressed bands, following the sequence of the above-described compression processing. The process of transmitting the image data comprising data of all the colors for each band will be referred to hereinbelow as "data transfer in a band sequence". When the printing apparatus is, for example, an apparatus for conducting printing in one-plane units of the printing medium, such as a four-cycle laser printer, the printing apparatus cannot start printing processing unless at least the image data of one color of one plane are received. Therefore, when data transfer is conducted in a band sequence, the printing apparatus does not start printing processing till the image data of all the colors of one plane are received.

Further, with another transfer method for data, the image data compressed for each band are stored for one plane in the host apparatus and then the stored image data for one plane are transmitted sequentially color by color. For example, when the image data are composed of data of four colors YMCK, first, all the data for Y, of the image data of one plane that were stored, are transmitted, and then all the data for M, all the data for C, and all the data for K are sequentially transferred. The process in which the image data of one plane are thus transmitted color by color in turn will be referred to hereinbelow as "data transfer in a plane sequence". This method is employed, for example, in the apparatus described in Japanese Patent Application Laid-open No. 2002-236563. When the printing apparatus is a four-cycle laser printer or the like and carries out the printing processing color by color for each plane, the printing processing can be started even if all the image data for one plane have not been assembled. Conducting such data transfer in a plane sequence makes it unnecessary to delay the start of printing processing till the image data of all the colors of one plane are received. The so-called flying start is possible.

DISCLOSURE OF THE INVENTION

However, with the above-described transfer method for data based on a plane sequence, the image data of one plane have to be temporarily stored in the host apparatus. As a result, the memory (RAM or the like) of the host apparatus is used and the processing performance of the host apparatus might be degraded.

Further, the problem associated with the transfer method for data based on the band sequence, as described hereinabove, is that in the case of a printing apparatus conducting processing in a plane sequence, the processing cannot be started till all the data for one plate are assembled and the printing processing cannot be rapidly completed.

Accordingly, it is an object of the present invention to provide a driver program or the like for causing a host apparatus to execute a processing of generating color-converted image data in the host apparatus and transferring them to a printing apparatus, this program or the like making it possible to decrease the volume of image data to be stored in the host apparatus and to conduct data transfer without a delay in a printing completion time.

In order to attain this object, in accordance with the first aspect of the present invention, there is provided a driver program for causing a host apparatus to execute a processing of generating image data comprising data of a plurality of colors and transferring the image data to a printing apparatus, wherein when the transfer of the image data of one plane is conducted, the driver program causes the host apparatus to execute a transfer processing of the image data conducted by intermingling a step of transferring to the printing apparatus by each band of bands obtained by dividing the image data of one plane at a prescribed height, and a step of transferring to the printing apparatus by each color of the plurality of colors. Therefore, in accordance with the present invention, the volume of data to be stored on the host apparatus side is reduced.

In order to attain the above-described object, in accordance with another aspect of the present invention, there is provided a driver program for causing a host apparatus to execute a processing of generating image data comprising data of a plurality of colors and transferring the image data to a printing apparatus, wherein when the transfer of the image data of one plane is conducted, the driver program causes the host apparatus to execute a first step of transferring to the printing apparatus the data of all or some colors of the plurality of colors by each band of bands obtained by dividing the image data of one plane at a prescribed height and storing the data of colors that are not transferred in the host apparatus when the transfer is conducted with respect to the data of some colors, and a second step of transferring the data stored in the first step to the printing apparatus by each color of the plurality of colors. Therefore, in accordance with the present invention, the volume of data to be stored on the host apparatus side is reduced.

In the preferred mode of carrying out the above-described invention, the number of colors for which data is transferred in the first step is changed at prescribed timing so that, with respect to the volume of data of each color stored in the host apparatus, that of a color used earlier in the printing apparatus is less than that of a color used later in the printing apparatus. As a result, it is possible to prevent the delay of printing completion.

Further, in the preferred mode of carrying out the above-described invention, the aforementioned prescribed timing is determined based on the position of the band for which the transfer or storage processing is conducted or based on the volume of the data for which the transfer and storage processing has been completed.

In order to attain the above-described object, in accordance with another aspect of the present invention, there is provided a data transfer method for transferring image data comprising data of a plurality of colors generated in a host apparatus to a printing apparatus, wherein when the transfer of the image data of one plane is conducted, the image data transfer is conducted by intermingling a step of transferring to the printing apparatus by each band of bands obtained by dividing the image data of one plane at a prescribed height and a step of transferring to the printing apparatus by each color of the plurality of colors.

In order to attain the above-described object, in accordance with another aspect of the present invention, there is provided a data transfer method for transferring image data comprising data of a plurality of colors generated in a host apparatus to a printing apparatus, wherein when the transfer of the image data of one plane is conducted, the data transfer method comprises a first step of transferring to the printing apparatus the data of all or some colors of the plurality of colors by each band of bands obtained by dividing the image data of one plane at a prescribed height and storing the data of colors that are not transferred in the host apparatus when the transfer is conducted with respect to the data of the some colors, and a second step of transferring the data stored in the first step to the printing apparatus by each color of the plurality of colors.

Additional objects and feature of the invention will become evident from the below-described preferred embodiments of the present invention.

BRIEF DESCRIPTION OF THE DRAWINGS

FIG. 2 is a flow chart illustrating the sequence of data transfer processing;

BEST MODE FOR CARRYING OUT THE INVENTION

Figure 1:
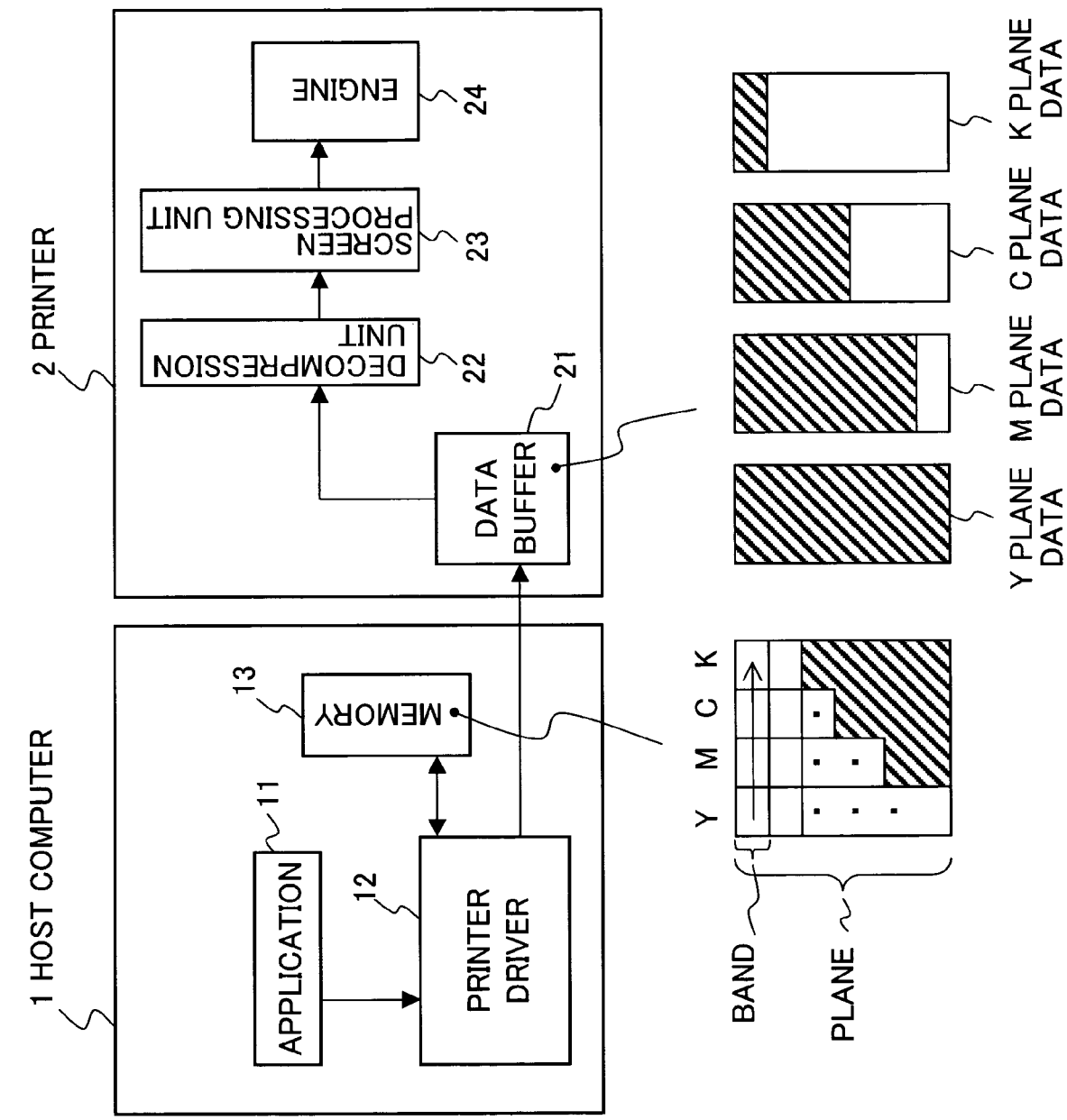
FIG. 1 shows the configuration of the embodiment of the present invention.

The embodiments of the present invention will be described below with reference to the drawings. However, those embodiments place no limitation on the technological scope of the present invention. Further, in the drawings, the same or identical components are assigned with the same reference numbers or reference symbols.

FIG. 1 shows the configuration of an embodiment of the printing system using the driver program in accordance with the present invention. A printer driver 12 shown in FIG. 1 is a driver program using the present invention in a printing system comprising a host computer 1 and a printer 2 and serving to transfer image data after color conversion processing, which is to be sent to the printer 2, by a method of intermingling the above-described band sequence and plane sequence and to reduce the volume of image data to be stored in the host computer 1.

The host computer 1 is a host apparatus of the present embodiment; it transmits image data after color conversion processing to the printer 2 and carries out a printing request. As shown in FIG. 1, the host computer 1 comprises an application 11, a printer driver 12, and a memory 13. The host computer 1 can be configured of the so-called personal computer. The application 11 is a printing request source, for example, a text creation software and transfers the data that is the printing object to the printer driver 12 in the prescribed format.

The printer driver 12 is a unit that receives the printing request from the application 11, generates image data, and transmits the image data to the printer 2. The printer driver 12, first, interprets the data from the application 11 and expands the printing object to image data, which is the data for each pixel. The image data that is generated herein is, for example, data composed of density values of each color: R (red), G (green), and B (blue). Then, the printer driver 12 implements a color conversion processing in the above-described band units with respect to the above-mentioned RGB image data and converts the data into YMCK data used by the printer 2. The printer driver 12 implements the compression processing in the band units with respect to the generated image data having the data of each color of YMCK for each pixel. This is done to shorten the data transfer time to the printer 2.

The compressed image data is in a state in which it can be transferred to the printer 2. The printer driver 12 conducts data transfer processing with respect to the image data that were subjected to the compression treatment, and the specific feature of the present printer driver 12 is in this data transfer method. With respect to data of one plane, first, the transfer in a band sequence is conducted and then the transfer mode is switched to the transfer in a plane sequence and the transmission to the printer 2 is conducted; this operation will be described below in greater detail. Further, during the transfer in a band sequence, the number of colors of the image data transferred to the printer 2 is sequentially reduced. The color data that were not transferred to the printer 2 due to this reduction are stored in the memory 13. The printer driver 12 can be composed of a program designating the procedure of the above-described processing and a control unit for executing the processing according to this program and so on.

Further, the memory 13 is a RAM provided in the host computer 1 and is used for various applications, but when printing is executed, this memory temporarily stores part of the image data compressed by the printer driver 12. In FIG. 1, the drawing below the memory 13 shows schematically the image data of one plane after the compression processing. The image data of one plane are composed of a plurality of band data and, as described above, is composed of YMCK data after color conversion. While the printer driver 12 transfers the one-plane data, the image data, for example, of the section shown by hatching in the figure, is temporarily stored in the memory 13.

The printer 2 is a four-cycle laser printer that receives the image data from the host computer 1 and executes printing based on the image data. As shown in FIG. 1, the printer 2 comprises a data buffer 21, a decompression unit 22, a screen processing unit 23, and an engine 24. The data buffer 21 is a section storing image data successively transferred from the printer driver 12. In FIG. 1, the drawing shown below the data buffer 21 shows schematically the image data stored in the data buffer 21. As shown in the figure, the image data of one plane are stored in the data buffer 21 for each YMCK color, and they are called "plane data".

The printing processing from the processing in the below-described decompression unit 22 to the implementation of printing in the engine 24 is executed in one-plane units continuously color by color. Therefore, the plane data for each color has to be arranged in the data buffer 21 before the printing processing for each color is initiated. In other words, with respect to a plane for which the printing processing is conducted, the printing processing can be initiated even in a state in which the plane data for all the colors has not been received from the host computer 1. Thus, the so-called flying start is possible. In the present embodiment, the printing processing will be implemented in the YMCK sequence. For example, if the hatched section in the drawing below the data buffer 21 shown in FIG. 1 is the data that has already been stored in the data buffer 21, it can be said that in the state shown in the drawing, the printing processing can be initiated for Y of the first color, provided that other conditions are met. Therefore, the data buffer 21 is not necessarily required to have a capacity capable of storing all the plane data for four colors at the same time.

The decompression unit 22 is a section for fetching the compressed data from the data buffer 21 if the printing processing is initiated and for conducting the processing for restoring this data to the original state. Further, the screen processing unit 23 is a section for implementing the screen processing of the data decompressed in the decompression unit 22 and converting the data for each pixel into the dot image data. The engine 24 is a section for executing the printing on a printing medium based on the screen processed data. The processing operations conducted by those decompression unit 22, screen processing unit 23, and engine 24 are carried out synchronously and, as described hereinabove, executed continuously for each color in plane units.

Figure 3A:
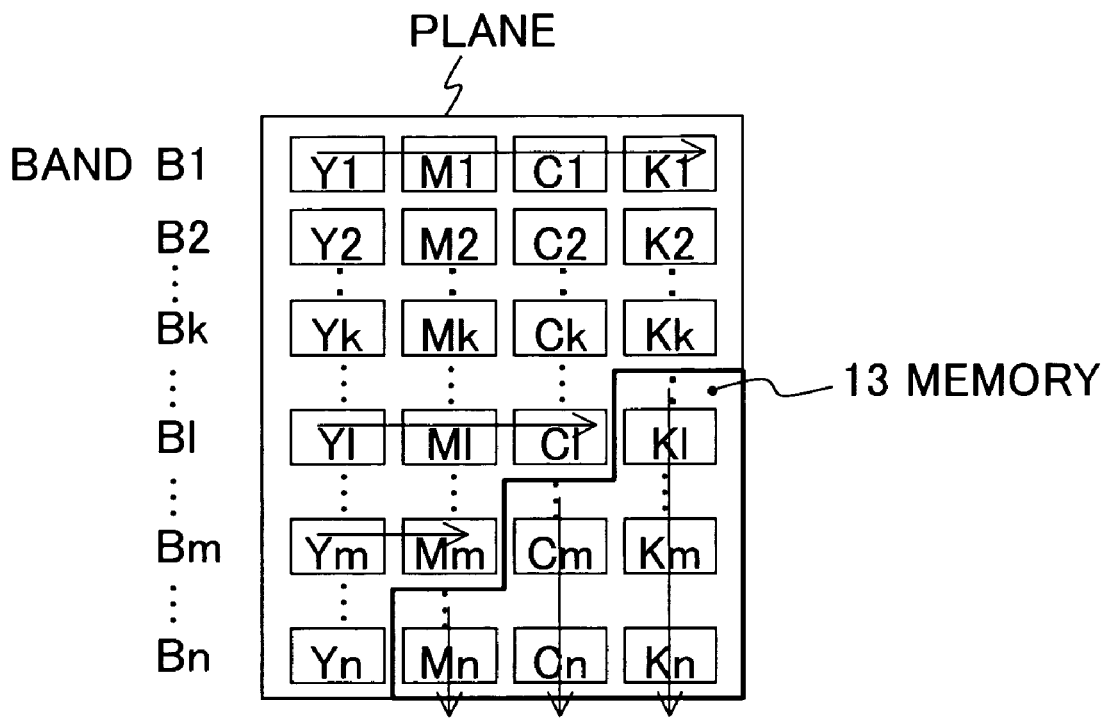
FIG. 3 illustrates schematically the image data that is a transfer object.

FIG. 2 is a flow chart illustrating the procedure of data transfer processing carried out by the printer driver 12. The contents of the data transfer processing, which is a specific feature of the present printer driver 12, will be explained below based on FIG. 2. First, the printer driver 12 checks whether or not the size of the image data of one plane transferred from the printer driver to the printer 2 is less than the predetermined value (step 1). FIG. 3 illustrates schematically the image data that is the transfer object. FIG. 3A shows the image data of one plane transferred by the printer driver 12. In the example shown in the figure, one plane is divided into n bands. The bands will be called B1, B2, . . . , Bn in the order from the top and YMCK data contained in each of those bands will be denoted by Y1-Yn, M1-Mn, C1-Cn, K1-Kn. The above-mentioned size of the image data of one plane means the size of all the data shown in FIG. 3A.

When the data size is judged to be less than the predetermined value by the above-mentioned check (Yes in step S1), the printer driver 12 conducts data transfer in a band sequence (step S2). More specifically, because, as described hereinabove, the compression processing preceding the data transfer is conducted in band units, the data of the band where the compression processing ended are directly sequentially transmitted to the printer 2, without storing in the memory 13. In the example shown in FIG. 3A, if the data of band B1 is compressed, this data, that is, Y1, M1, C1, K1, is transferred to the printer 2, and if then the data of band B2 is compressed, then Y2, M2, C2, K2, is transferred to the printer 2. Then, the data of the band is similarly transferred each time the compression processing is conducted. Further, the transfer for each band is conducted till the compression processing is completed for the image data of one plane that is the object (till band Bn) and data transfer processing for the one-plane is completed.

On the other hand, when the data size was judged in step S1 not to be less than the predetermined value (No in step S1), the printer driver 12, first, conducts data transfer in a band sequence up to a predetermined band (k-th band) (step S3). More specifically, similarly to step S2, the data of the bands subjected to compression processing are not stored in memory 13 and directly transferred to the printer 2 up to the band Bk. In the example shown in FIG. 3A, the data are transferred in the order of bands of B1, B2, . . . , Bk. More specifically, data transfer is conducted in the order of Y1→M1→C1→K1→Y2→M2→C2→K2, following the direction of arrows shown in band B1 in the figure.

Then, if the transfer of band Bk is completed, the printer driver 12 conducts the processing of transferring the YMC data in a band sequence with respect to compressed band data up to the predetermined band ($1^{st}$ band) and storing the remaining K data in the memory 13 (step S4). In the example shown in FIG. 3A, data transfer is conducted in the order of Yk+1→Mk+1→Ck+1→Yk+2→ . . . Y1→M1→C1, following the direction of arrows shown in band B1, and the data of Kk+1-K1 are stored in the memory 13.

Then, if the transfer of band B1 is completed, the printer driver 12 conducts the processing of transferring the YM data in a band sequence with respect to compressed band data up to the predetermined band (m-th band) and storing the remaining CK data in the memory 13 (step S5). In the example shown in FIG. 3A, data transfer is conducted in the order of Y1+1→M1+1→Y1+2→ . . . Ym→Mm, following the direction of arrows shown in band Bm, and the data of C1+1-Cm and K1+1-Km are stored in the memory 13.

Then, if the transfer of band Bm is completed, the printer driver 12 conducts the processing of transferring only the Y data with respect to the compressed band data up to the predetermined band (n-th band), in other words, till the compression processing is completed for the data of one plane, and storing the remaining MCK data in the memory 13 (step S6). In the example shown in FIG. 3A, data transfer is conducted in the order of Ym+1→Ym+2→ . . . Yn, and the data of Mm+1-Mn, Cm+1-Cn and Km+1-Kn are stored in the memory 13.

Figure 3B:
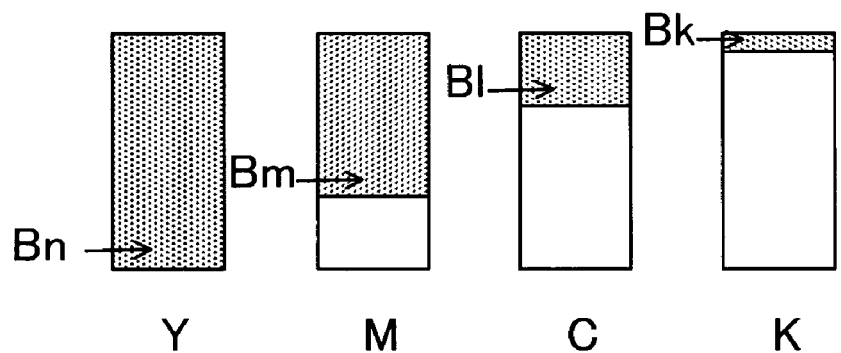

Once the processing of this step S6 has ended, that is, once the compression processing with respect to data of one plane has ended, all the data are transferred for Y, data up to the band Bm are transferred to M, data up to the band Bl are transferred to C, and data up to the band Bk are transferred to K. FIG. 3B shows schematically the plane data of each color stored in the data buffer 21 on the printer 2 side at this time. Colored sections in the figure represent the stored data, and the data of the band for which the aforementioned transfer has been conducted for each color are stored in the data buffer 21. Further, at this time, the Mm+1-Mn, C1+1-Cn, Kk+1-Kn data are stored in memory 13. In FIG. 3A, data in the portion surrounded by a thick line are stored in the memory 13.

When data transfer in a band sequence from step S3 to step S6 is thus completed, the printer driver 12 transmits the data stored in the memory 13 to the printer 2 in a plane sequence. First, all the M data stored in memory 13 are transferred (step S7). In the example shown in FIG. 3A, data transfer is conducted in the order of Mm+1→Mm+2→ ... →Mn, following the direction of a downward arrow shown on M data.

Then, similarly, all the C data stored in the memory 13 are transferred (step S8). In the example shown in FIG. 3A, data transfer is conducted in the order of C1+1→C1+2→ ... →Cn, following the direction of a downward arrow shown on C data. Then, continuously, all the K data stored in the memory 13 are transferred (step S9). In the example shown in FIG. 3A, data transfer is conducted in the order of Kk+1→Kk+2→ ... →Kn, following the direction of a downward arrow shown on K data.

When the transfer of data stored in memory 13 is thus completed, the data transfer processing relating to the image data of one plane is completed.

Figure 4:
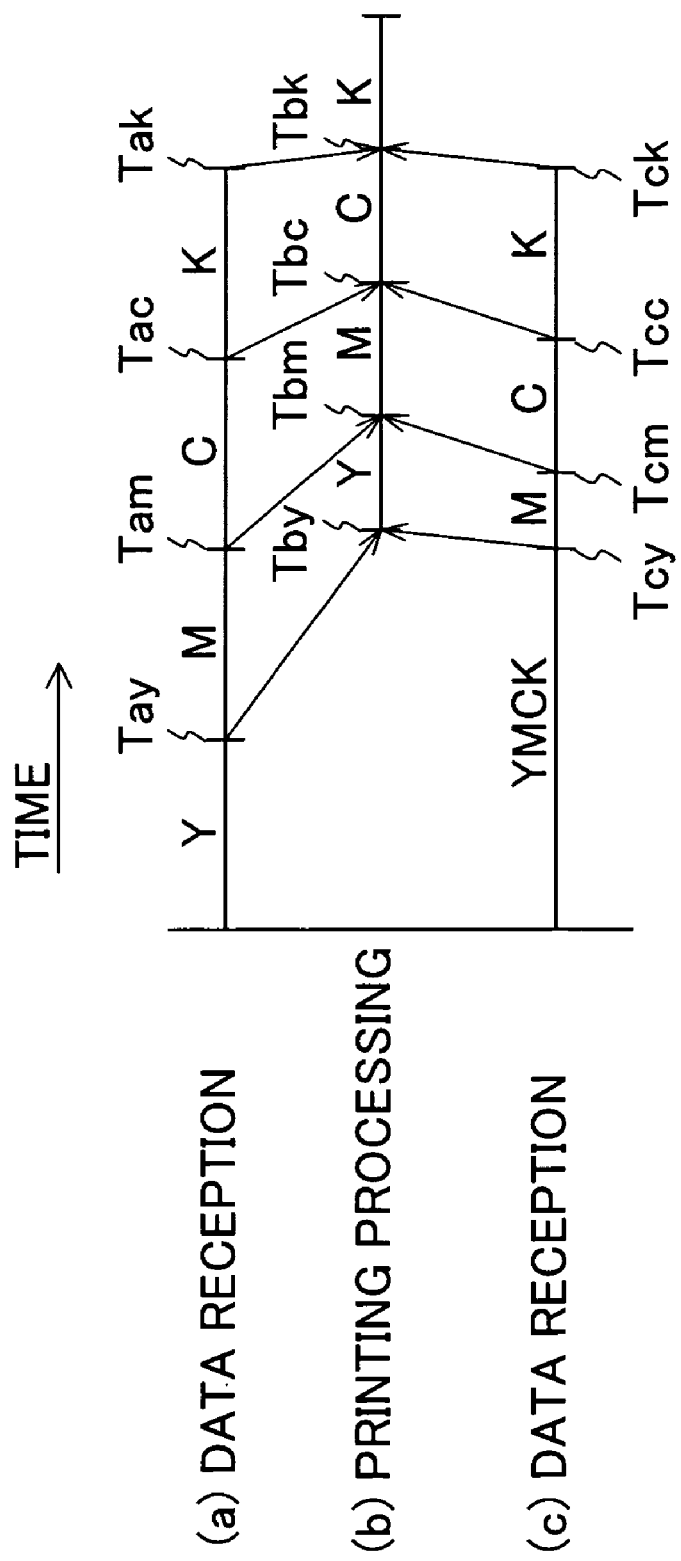
FIG. 4 is a time chart illustrating the timing of data reception and printing processing.

As explained hereinabove, when transmitting the image data of one plate, the printer driver 12 intermingles the band sequence and plane sequence and does not transmit all the data in a plane sequence, but the delay of printing completion in the printer 2 can be substantially avoided, when compared with the case where all the data are transmitted in a plane sequence. FIG. 4 is a time chart illustrating an example of data reception and printing processing timing in the printer 2. (a) in FIG. 4 shows an example of data reception timing in the case where data transfer was conducted from the host computer 1 to the printer 2 in the above-described plane sequence. Each interval shown by Y, M, C, K in the figure represents an interval in which plane data of the respective color was received. Tay, Tam, Tac, Tak which are the end points of those intervals represent the timing at which data reception of each color is completed.

Similarly, (c) in FIG. 4 shows an example of data reception timing in the case where data transfer was conducted by the printer driver 12, and Tcy, Tcm, Tcc, Tck represent the timing at which data reception of each color is completed.

Further, (b) in FIG. 4 shows an example of printing processing timing in the case where data reception is completed at the timing shown in (a) of FIG. 4. Here, the printing processing, as described hereinabove, means a continuous processing from the plane data stored in the data buffer 21 are read out till printing is executed in the engine 24. Further, in the case shown in (a) of FIG. 4, the above-described flying start is possible. Therefore, in the example shown in (b) of FIG. 4, printing processing of the first color is started before the data of all the colors of one plane is received. Furthermore, in the example shown in (b) of FIG. 4, the case is assumed where the printing end is actually the earliest.

With respect to Y for which printing processing is initially conducted, if only the processing with respect to Y is considered, then printing processing may be started immediately after all the Y data has been received, but because, as described hereinabove, printing processing of four colors is conducted continuously and interruption thereof is undesirable, the printing start of the first color, even when it is actually the earliest, is determined after the M data of the second color has been received, with consideration for delay in the data transfer time after Y. Thus, the earliest Tby, which is the start time of Y printing processing, is immediately after the Tam.

Further, because data reception has to be completed before the processing is started with respect to printing processing of K, which is the last color, the earliest Tbk, which is the start time of K printing processing, is immediately after the Tak. Further, because the printing time of each color in the printer 2 is the same, in the case of data reception shown in (a) of FIG. 4, the example illustrated by (b) of FIG. 4 corresponds to the case, where the printing end is actually the earliest.

If we consider whether or not the data transfer with the printer driver 12 is good enough for the timing of this printing processing, then in the example shown in (c) of FIG. 4, Tcy, Tcm, Tcc, Tck, which are the data reception end timing of each color, are earlier than Tby, Tbm, Tbc, Tbk, which are the printing processing start timing of each color, and the printing processing shown in (b) of FIG. 4 is possible. Here, the point Tck in time the reception of K data is completed, that is, the point in time the one-plane data reception is completed is same timing as the case shown in (a) of FIG. 4, because the data volume of one plane is the same and there is no difference in transmission rate. The Tcy where the Y data reception is completed is the point in time where the above-described step S6 illustrated by FIG. 2 has ended, and at this point in time, the data buffer 21 becomes a state shown in FIG. 3B. Those Tcy, Tcm, and Tcc vary depending on the values of k, l, m of the above-described bands Bk, Bl, Bm, but the values of k, l, m can be determined so as to obtain timings of Tcy, Tcm, Tcc shown in (c) of FIG. 4.

Therefore, using the data transfer method of the present embodiment, makes it possible to maintain actually the earliest printing end time when data transfer is conducted in a plane sequence and the delay in printing end time can be actually avoided.

As described hereinabove, the printer driver of the present embodiment, with respect to color-converted image data, first, conducts data transfer in a band sequence, while reducing the number of colors that are successively transferred, each time the compression processing of one band is completed and also stores the non-transferred data and, after the compression processing has been completed for the data of one plane, conducts data transfer of the stored data in a plane sequence. Therefore, it is not necessary to store the data of one plane in the host computer 1 and the volume of data to be stored in the host computer 1 can be reduced by comparison with the case where data transfer is conducted only in the above-described plane sequence. Furthermore, as described hereinabove, with this method for transferring data with the printer driver 12, there is actually no delay in printing end time compared to that of plane sequence. With the printer driver 12, when the quantity of data to be transferred is small, data transfer in a band sequence is conducted, but because data transfer in this case usually is not a time-consuming operation, it is not necessary to conduct a flying start in the printer 2 and no adverse effect is produced on the printing end time.

Further, in the above-described embodiment, the number of colors of the data to be transferred varies depending on the band Bk, Bl, Bm, that is, on the band number, but this number of colors may be changed by the data size. For example, with respect to data of one plane, transfer and storage may be also conducted so that initially all the four colors are transferred up to X1 kb (kilobyte) and then three colors are transferred and one color is stored till X2 kb.

The protection range of the present invention is not limited to the above-described embodiment and covers the inventions described in the claims and equivalents thereof.

The invention claimed is:

1. A non-transitional computer readable medium recording a driver program for causing a host apparatus to execute a processing of generating image data comprising data of a plurality of colors and transferring said image data to a printing apparatus, wherein
when the transfer of said image data of one page is conducted, the driver program causes said host apparatus to execute as follows:

if an amount of said image data corresponding to said one page is smaller than a predetermined amount, said image data corresponding to said one page is transferred to said printing device by band sequential transfer in which:

said image data corresponding to said one page is divided at prescribed heights into a plurality of bands, each of said plurality of bands comprising data of said plurality of colors, and data of all of said plurality of colors in each band of said plurality of bands is transferred on a band-by-band basis in accordance with a height order of said bands irrespective of color without storing in said host apparatus; or if said amount of said image data corresponding to one page is equal to or more than said predetermined amount:

a first step of executing, for said plurality of bands on a band-by-band basis in accordance with the height order of said bands, a processing of transferring to said printing apparatus the data of some colors of said plurality of colors in the band and storing the data of the remaining colors in the band that are not transferred in said host apparatus, wherein during said first step, as the processing continues on a band-by-band basis, the number of colors per band for which data is transferred is reduced, and a second step of executing, after said first step and for all the data stored in said first step, a processing of transferring the data stored in said first step to said printing apparatus by each color of the stored remaining colors.

2. The non-transitional computer readable medium according to claim 1, wherein the number of colors for which data is transferred in said first step is changed at prescribed timing so that, with respect to the volume of data of each color stored in said host apparatus, that of a color used earlier in said printing apparatus is less than that of a color used later in said printing apparatus.

3. The non-transitional computer readable medium according to claim 2, wherein said prescribed timing is determined based on the position of said band for which said transfer or storage processing is conducted or based on the volume of the data for which said transfer and storage processing has been completed.

4. The non-transitional computer readable medium according to claim 1, wherein during said first step, as the processing continues on a band-by-band basis, the number of colors per band for which data is stored in said host apparatus is increased.

* * * * *